Jan. 2, 1940. W. F. THOMA 2,185,321
WINDOW OPERATING MECHANISM
Filed July 27, 1938 3 Sheets-Sheet 1

INVENTOR
Willard F. Thoma
BY
Harness, Dickey & Pierce
ATTORNEYS.

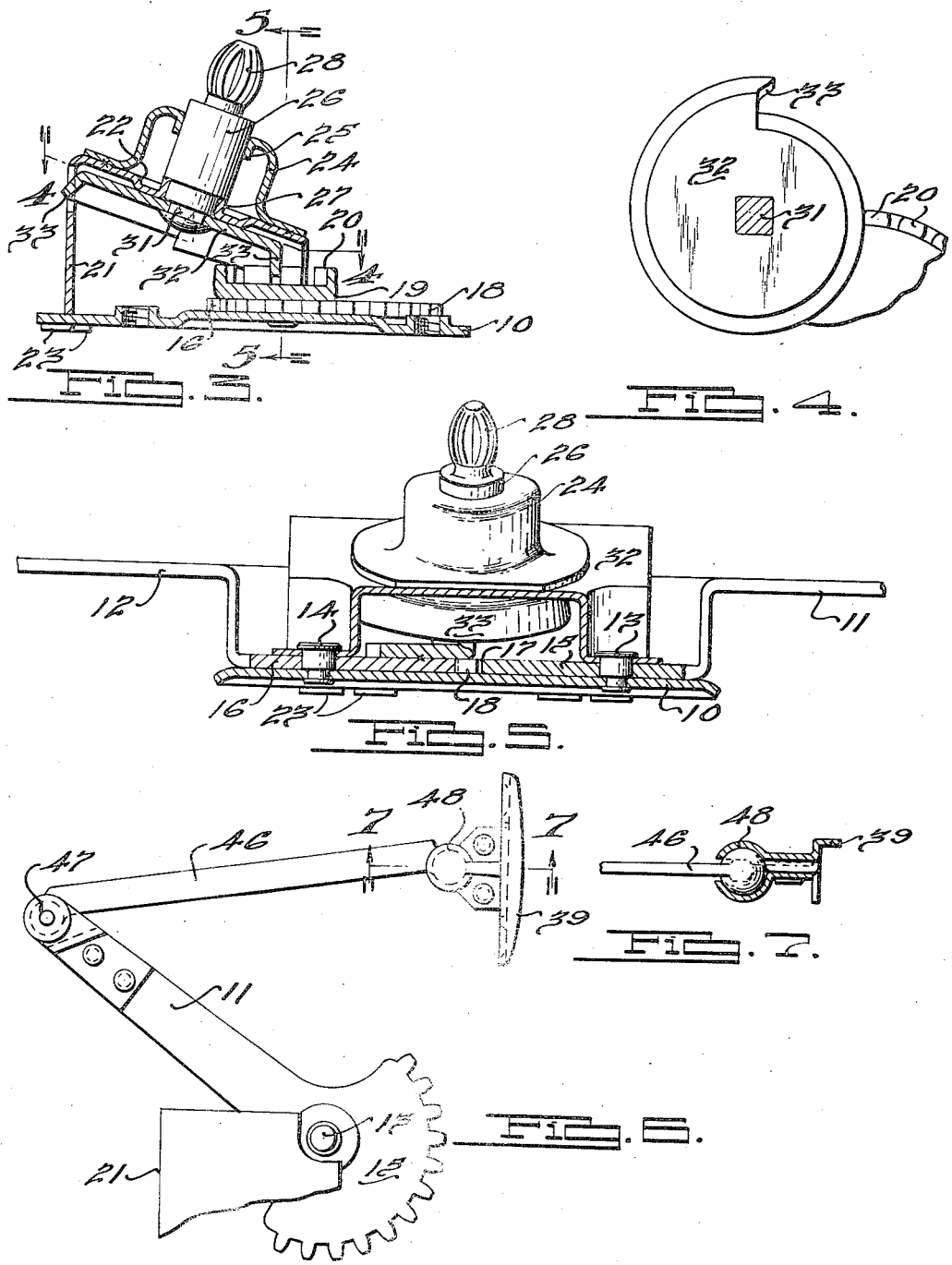

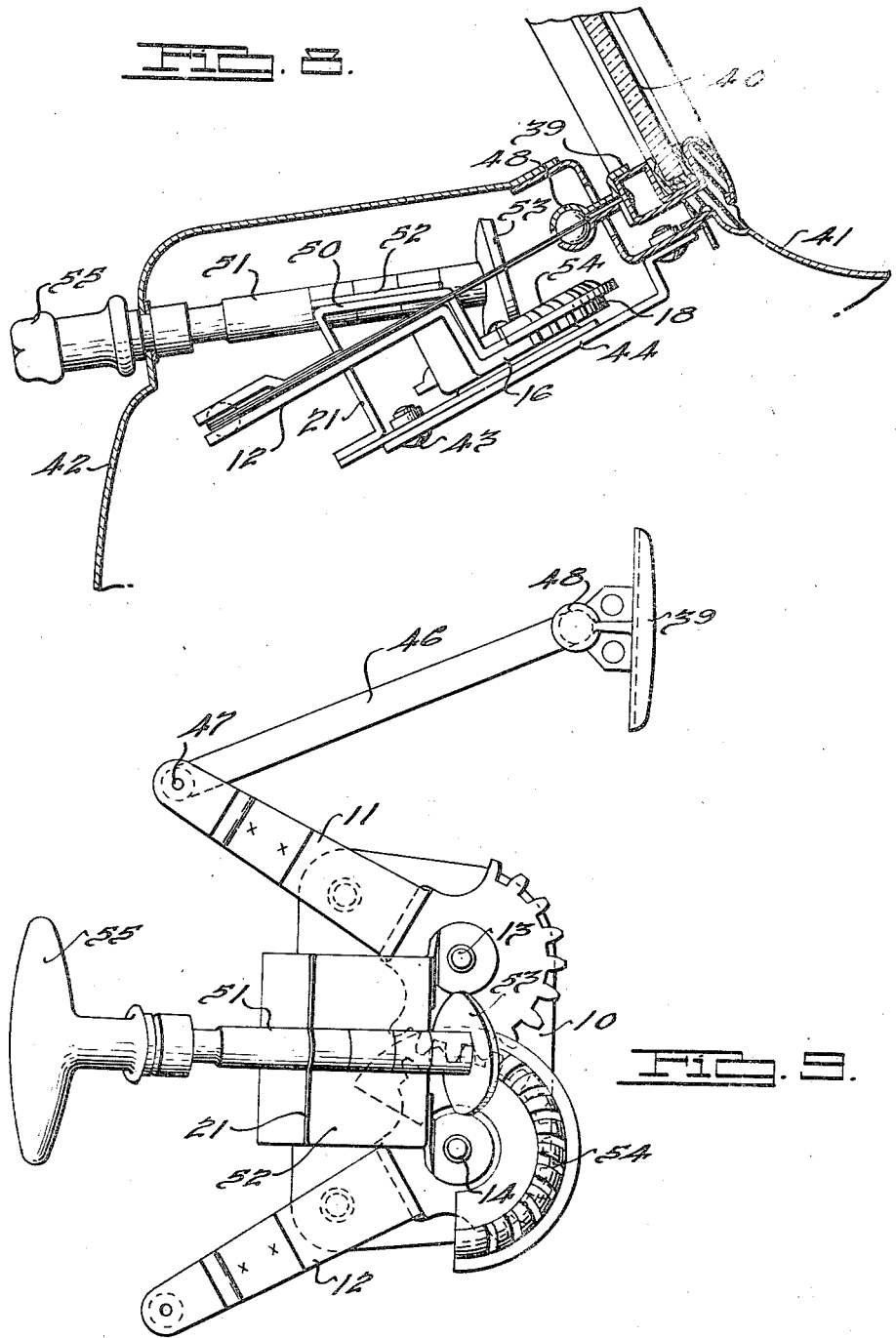

Patented Jan. 2, 1940

2,185,321

UNITED STATES PATENT OFFICE 2,185,321

WINDOW OPERATING MECHANISM

Willard F. Thoma, Detroit, Mich., assignor to National Stamping Company, Detroit, Mich., a corporation of Michigan Application July 27, 1938, Serial No. 221,573

7 Claims. (Cl. 296—84)

This invention relates to windshield and window operating mechanism.

The main objects of this invention are to provide an improved operating mechanism which can be constructed entirely of stampings; to provide an operating mechanism of relatively few parts and simple in construction; to provide an operating mechanism which is sturdy in construction and which will give long service without trouble or repair; to provide an operating mechanism which may be utilized to open two windshields of an automobile body simultaneously or which may be adapted with equal facility to operate the window glass in a door and maintain the window glass level or straight without binding in its run at all times; to provide an operating mechanism which is sufficiently flexible to permit the windshield to which it is attached to swing out of alignment with the plane of its operating arm; and to provide an operating mechanism of this character which may be produced at relatively low cost.

An illustrative embodiment of this invention is shown in the accompanying drawings, in which:

Fig. 3 is a sectional view taken on the line 3—3 of Fig. 2, looking in the direction indicated by the arrows;

Fig. 4 is a sectional view taken on the line 4—4 of Fig. 3, looking in the direction indicated by the arrows;

Fig. 5 is a sectional view taken on the line 5—5 of Fig. 3, looking in the direction indicated by the arrows;

Fig. 6 is a plan view of a modified form of operating arm;

Fig. 7 is an enlarged fragmentary sectional view taken on the line 7—7 of Fig. 6;

Fig. 8 is a view similar to Fig. 1, showing a modified form of operating mechanism in which the operating handle extends through the front face of the instrument panel;

Fig. 9 is a top plan view of the operating mechanism shown in Fig. 8.

Figures 1, 2:
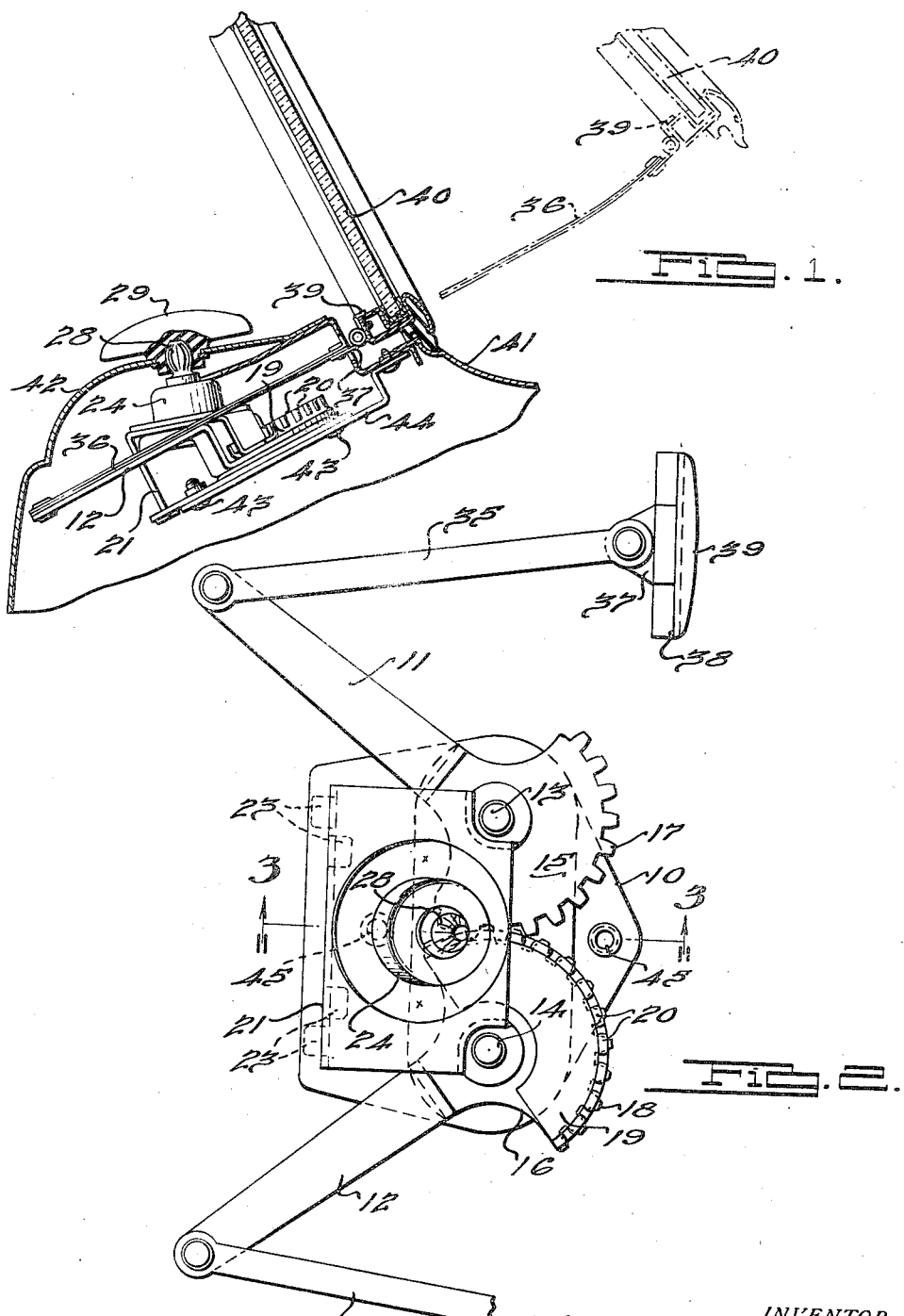
Fig. 1 is a view in side elevation of the preferred embodiment of the improved window operating mechanism, mounted on an automobile cowl and instrument panel to operate a windshield, with the operating handle on top of the instrument panel, the position of the operating arms when in an extended position being shown in dotted outline.
Fig. 2 is a top plan view of the improved operating mechanism in retracted position.

The invention, as herein illustrated, is shown as being applied to the windshield of an automobile body, but it is to be understood that it may be equally well applied to the door windows of an automobile body, and that the term window as used throughout the specification and claims is intended to mean, include, and encompass windows of all character, including the front window or windshield, as it is commonly designated, as well as the door windows of an automobile body or other constructions.

In the construction shown in the drawings, the invention comprises a base plate or mounting support in the form of a sheet metal stamping 10 upon which is pivotally mounted a pair of operating arms 11 and 12, which are relatively stiff sheet metal stampings. The arms 11 and 12 are journalled on spaced pivots 13 and 14, the axes of which are in parallel relation.

Each of the arms 11 and 12 extends beyond its point of pivotal support and is shaped in the form of segments 15 and 16, respectively, the marginal edges of which are provided with integrally formed gear teeth 17 and 18, respectively. The gear teeth 17 and 18 intermesh so that movement about its pivot of one of said arms causes the other arm to move in unison therewith.

The segment 16 of the arm 12 is provided on its upper side with a gear wheel 19 in the form of a semi-circular sheet metal stamping having the marginal arcuate edge thereof turned up at right angles to the plane of the body and notched out to provide worm wheel teeth 20. The worm wheel 19 is mounted on the segment 16 concentric with respect to the axis 14 of pivotal support of the arm 12.

The base 10 has a bridge member 21 of inverted U-shape, mounted thereon, the medial portion 22 of which is in spaced relation to the plate 10 and is inclined with respect thereto. The bridge member 21 is securely mounted on the base plate 10 by having lugs or tabs 23 integrally formed thereon which extend through registering slots in the base plate and which are turned at right angles in opposite directions at the under side of the plate 10, to hold the parts together in the usual and well known manner.

The medial inclined portion 22 of the bridge member has a bearing member 24, also a sheet metal stamping, welded or otherwise suitably secured thereon which, in the preferred embodiment, is in the form of an inverted cup having a perforation through the center of the bottom thereof and having an inturned flange 25 around said opening which serves as one of the bearing supports of a shaft 26. The inclined medial portion 22 of the bridge member is also provided with an opening therethrough in axial alignment with the opening in the bearing member 24 and the marginal edge of the bridge opening is also provided with a flange 27 which also forms a bearing support for the other end of the shaft 26, the inturned edge of the flange abutting against a shoulder formed on the shaft 26.

The outer end of the shaft 26 is shaped as shown at 28 to receive a T-shaped operating handle 29 by which the shaft may be manually rotated. The inner end of the shaft 26 is provided with a square portion 31 which extends through and fits a complementary square opening in a shallow, cup-shaped, sheet metal stamped form 32. The rim or marginal edge 33 of the worm 32 is shaped in the form of a helix, as shown most clearly in Fig. 4 of the drawings, and meshes with and drives the worm teeth 20 on the worm wheel 19.

The other end of the operating arms 11 and 12 each have pivoted thereto one end of operating arms 35 and 36, respectively. The other ends of the arms 35 and 36 are pivoted to the leaf 37 of a hinge 38, the base 39 of which is attached to the frame of a window in the form of a windshield 40.

The operating unit is mounted on the cowl 41 of an automobile body and under an instrument panel 42 by securing it with screws 43 which pass through a mounting bracket 44 and which are received in threaded apertures 45 formed in the base plate 10.

In the preferred embodiment of the invention, the operating arms 35 and 36 are preferably formed of two thicknesses of a relatively thin, flexible, flat, strap member which provides rigidity in one longitudinal plane and permits flexing in a longitudinal plane normal with respect to said first mentioned longitudinal plane so that when attached to a windshield and the windshield pivoted on a hinge along the top edge thereof, as shown in Fig. 1, the opening of the windshield is permitted by flexing of the outer arms 35 and 36.

In the modification shown in Figs. 6 and 7 of the drawings, the outer arms 46 are attached to the inner arms and windshield attaching clip by ball and socket joints generally designated 47 and 48. Sufficient movement is provided for in the ball and socket joints 47 and 48 to permit swinging of the windshield to the position shown in Fig. 1 of the drawings without placing a strain on the inner relatively stiff operating arm 11.

In the modification shown in Figs. 8 and 9 of the drawings, the inclined medial portion 50 of the bridge member 21 is of different shape than that shown in the preferred embodiment of the invention, and is formed to provide one-half of a bearing for a shaft 51 which is journalled thereon by a member 52 which is secured to the medial portion 50 of the bridge member and which serves as the other half of the bearing for the shaft. The inner end of the shaft 51 has a worm 53 rigidly secured thereto of slightly different shape than the worm shown in the preferred embodiment and which meshes with a worm wheel 54. The worm wheel 54 is rigidly secured to the segmental portion of one of the operating arms concentric with respect to its point of pivotal support in the same manner as the worm wheel illustrated in the preferred embodiment.

The other end of the shaft 51 extends substantially horizontally and protrudes through the front face of the instrument panel 42 and is provided with a T-shaped operating handle 55.

In the operation of this device, the unit is secured in position on the bracket 44 by the screws 43 and the clips 39 are secured to the windshield frame. The operating handle 29 or 55, as the case may be, is then attached on the outer end of the worm shaft.

Manual operation of the handles 29 or 55 will rotate their respective worm shafts 26 and 51 so as to cause their respective worms 32 and 53 to rotate and operate the respective worm wheels with which they are meshed. Rotation of the worm wheels will rotate the operating arm to which the worm wheel is attached, and by reason of the intermeshing of the gear teeth between the operating arms, the opposite operating arm will move in unison therewith.

In the preferred embodiment of the invention, the outer arms 35 and 36 are sufficiently flexible to permit the windshield to swing out and raise up with respect to the plane of the operating arms, as shown in Fig. 1 of the drawings.

In the embodiment of the invention illustrated in Figs. 6, 7, 8 and 9, the outer operating arms, through their ball and socket joints, permit an equivalent action to take place.

Although but two specific embodiments of the invention have been herein shown and described, it will be understood that numerous other embodiments and specific constructions may be provided and details of the constructions herein shown and described, may be altered or omitted without departing from the spirit of this invention, as defined by the following claims.

What is claimed is:

1. In a window operating mechanism, a supporting base, a pair of window operating arms pivoted on said base, intermeshing toothed segments integrally formed on said arms for pivotally moving said arms in unison, a worm wheel secured to one of said arms concentric with its axis of pivotal mounting, and a worm meshing with and driving said worm wheel to pivotally actuate said arms in unison.

2. In a window operating mechanism, a supporting base, a pair of window operating arms pivoted on said base with the axes of their pivots in spaced parallel relation, each of said arms having a gear segment, said segments being intermeshed for causing pivotal movement of said arms in unison, a worm wheel secured to one of said arms concentric with its axis of pivotal mounting, and a worm meshing with said worm wheel for pivotally actuating said arms in unison.

3. In a window operating mechanism, a supporting base, a pair of window operating arms pivoted on said base, each of said arms extending beyond its respective point of pivotal support, the extended ends of said arms being in the form of segments, gear teeth integrally formed on said segments and intermeshing to cause pivotal movement of said arms in unison, a worm wheel secured to one of said arms concentric with its axis of pivotal support, and a worm meshing with said worm wheel for pivotally moving said arms in unison.

4. In a window operating mechanism, a base plate, an inverted U-shaped bridge member mounted on said base plate, the medial portion of said bridge member being in spaced relation to said base plate, a pair of windshield operating arms pivoted on said base plate, means connecting said arms for causing pivotal movement of one when the other is pivotally moved, a worm wheel secured to one of said arms, and a worm journaled on the medial portion of said bridge and meshing with said worm wheel.

5. In a window operating mechanism, a base plate, an inverted U-shaped bridge member mounted on said base plate, a pair of windshield operating arms pivoted on said base plate, means connecting said arms for causing pivotal movement of one when the other is pivotally moved, a worm wheel secured to one of said arms in concentric relation to its pivotal axis, and a worm journaled on said bridge and meshing with said worm wheel.

6. In a window operating mechanism, a base plate, an inverted U-shaped bridge member mounted on said base plate, the medial portion of said bridge member being in spaced relation and inclined with respect to said base plate, a bearing member secured to the medial inclined portion of said bridge member, a pair of windshield operating arms pivoted on said base plate, each of said arms being extended beyond its pivotal axis and shaped to provide a segment, gear teeth integrally formed on each of said segments, said gear teeth being intermeshed for causing pivotal movement of said arms in unison, a worm wheel secured to one of said arms, and a worm journaled on said bridge and bearing members and meshing with said worm wheel.

7. In a window operating mechanism, a supporting base, a pair of window operating arms pivoted on said base, each of said arms extending beyond its respective point of pivotal support, the extended ends of said arms being in the form of segments, gear teeth integrally formed on said segments and intermeshing to cause pivotal movement of said arms in unison, worm teeth on one of said arms, and a worm meshing with said teeth for pivotally moving said arms in unison.

WILLARD F. THOMA.